United States Patent
Spatafora

(10) Patent No.: US 6,845,861 B2
(45) Date of Patent: Jan. 25, 2005

(54) PACKET CONVEYING ASSEMBLY

(75) Inventor: Mario Spatafora, Bologna (IT)

(73) Assignee: G.D.Societa' Per Azioni, Bologna (IT)

( * ) Notice: Subject to any disclaimer, the term of this patent is extended or adjusted under 35 U.S.C. 154(b) by 0 days.

(21) Appl. No.: 10/635,375

(22) Filed: Aug. 6, 2003

(65) Prior Publication Data
US 2004/0099507 A1 May 27, 2004

(51) Int. Cl.$^7$ .............................................. B65G 17/46
(52) U.S. Cl. ............................ 198/471.1; 198/377.08; 198/461.2; 198/459.2
(58) Field of Search ...................... 198/377.04, 377.08, 198/471.1, 459.2, 461.2, 457.07, 598

(56) References Cited

U.S. PATENT DOCUMENTS 4,380,283 A * 4/1983 van Maanen ............ 198/461.2
5,641,053 A * 6/1997 Nannini et al. ........... 198/461.3
5,901,530 A * 5/1999 Draghetti et al. ......... 198/471.1

FOREIGN PATENT DOCUMENTS

| DE | 2244174 | * | 3/1973 | |
|----|---------|---|--------|---|
| DE | 3426713 | | 1/1986 | |
| EP | 0 519 400 | | 12/1992 | |
| EP | 0 900 730 | | 3/1999 | |
| FR | 002670191 A1 | * | 6/1992 | .............. 198/471.1 |

* cited by examiner

Primary Examiner—James R. Bidwell
(74) Attorney, Agent, or Firm—Marshall, Gerstein & Borun LLP

(57) ABSTRACT

An assembly for conveying packets of cigarettes has a first and a second conveyor, which extend side by side along a given portion and are operated at a first and second speed respectively; and a transfer device, which has a deflecting member for transferring the packets of cigarettes from the first to the second conveyor along the given portion, and which is movable along the given portion.

22 Claims, 2 Drawing Sheets

US 6,845,861 B2

PACKET CONVEYING ASSEMBLY

The present invention relates to a packet conveying assembly.

More specifically, the present invention relates to an assembly for conveying packets of cigarettes between a machine upstream from a packet feed path, and a machine downstream from the feed path, to which the following description refers purely by way of example.

BACKGROUND OF THE INVENTION

In the cigarette packing industry, cigarettes are packed in sheets of wrapping material and/or cardboard blanks on automatic machines, on which the sheets of wrapping material and/or cardboard blanks undergo various folding operations. The packing process is performed on successive machines, which perform various packing steps. For example, a first machine forms packets defined by a sheet of foil wrapped about a group of cigarettes, and by a hinged-lid box formed from a blank; and a follow-up machine wraps the packets in a sheet of cellophane. The packets are therefore transferred between adjacent machines along given feed paths. A feed path is normally defined by a group of conveyors, in which a first conveyor operates at a travelling speed related to a first output rate of the upstream machine and a first packet spacing, and a second conveyor operates at a second travelling speed related to a second output rate of a downstream machine and a second spacing. Very often, the first and second travelling speed differ, so that the packets must be accelerated or decelerated, and the spacing changed, when being transferred between the first and second conveyor.

At times, situations occur in which the first and second speed cannot be maintained constant and vary considerably, even to the extent of being reduced to zero, as in the event of a breakdown of the upstream or downstream machine.

SUMMARY OF THE INVENTION

It is an object of the present invention to provide a straightforward, low-cost assembly for conveying and transferring packets between a first and a second conveyor operating at a first and a second speed varying independently of each other.

According to the present invention, there is provided an assembly for conveying packets, in particular packets of cigarettes, comprising a first and a second conveyor for conveying the packets at a first and a second travelling speed respectively; the assembly being characterized in that the first and the second conveyor extend side by side along at least a given portion in a first direction; the assembly comprising a transfer device having a deflecting member for transferring the packets from the first to the second conveyor along said given portion.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figure 1:
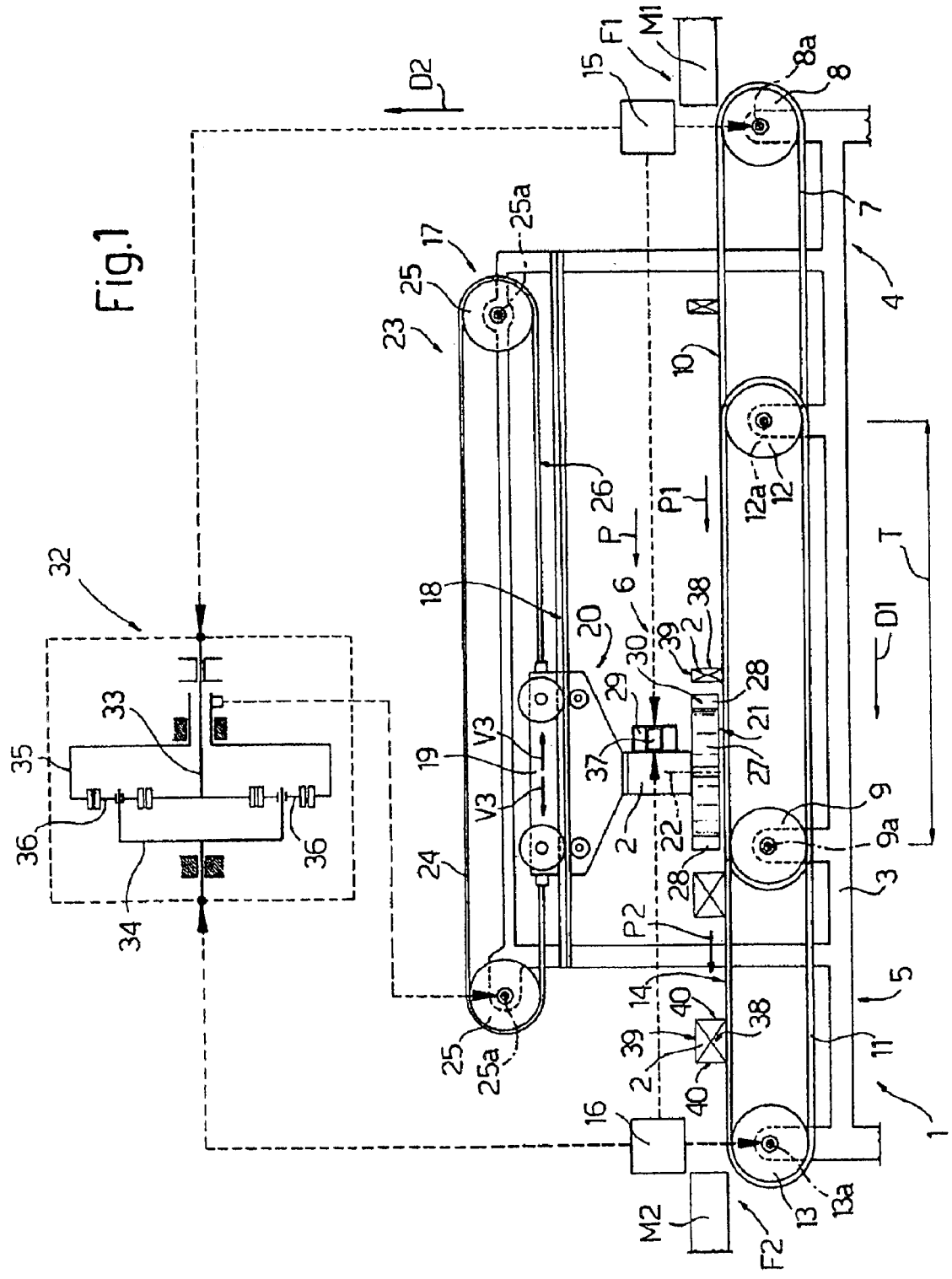
FIG. 1 shows a schematic side view, with parts removed for clarity, of a packet conveying assembly in accordance with the present invention.

Number 1 in FIG. 1 indicates as a whole an assembly for conveying packets 2 of cigarettes along a path P between a machine M1, located upstream from group 1 and supplying packets 2 at a rate F1, and a machine M2 located downstream from assembly 1 and supplied with packets 2 at a rate F2.

Assembly 1 comprises a frame 3, which supports a conveyor 4, a conveyor 5, and a deflecting device 6 for transferring packets 2 from conveyor 4 to conveyor 5. Conveyors 4 and 5 extend in a direction D1 between machines M1 and M2, are parallel and side by side along a portion T parallel to direction D1, and define two respective paths. P1 and P2 of packets 2. Conveyor 4 comprises a belt 7 looped about a drive pulley 8 and a driven pulley 9, and comprises a work branch 10, on which packets 2 rest and are conveyed at a speed V1. Conveyor 5 comprises a belt 11 looped about a driven pulley 12 and a drive pulley 13, has a work branch 14 coplanar with work branch 10 of conveyor 4, and conveys packets 2 at a speed V2. Drive pulleys 8 and 13 are operated respectively by two motors 15 and 16, which move belts 7 and 11 at respective speeds V1 and V2.

Motors 15 and 16 form part of a drive device 17 for driving conveyors 4 and 5 and transfer device 6 as a function of the travelling speeds V1 and V2 of conveyors 4 and 5. Drive pulleys 8 and 13 and driven pulleys 9 and 12 rotate about respective axes 8a, 13a, 9a and 12a parallel to one another and crosswise to direction D1.

Transfer device 6 is fitted to a guide 18 parallel to direction D1, and comprises a carriage 19 movable along guide 18 in direction D1 and having a bottom appendix 20, which supports a deflecting member 21 for rotation about an axis 22 parallel to a vertical direction D2. Transfer device 6 also comprises a conveyor 23 located at guide 18 and comprising a belt 24, which is looped about two pulleys 25 and has a bottom work branch 26 connected to carriage 19. Pulleys 25 rotate about respective axes 25a parallel to axis 8a, and work branch 26 extends in direction D1 by a distance at least substantially equal to the length of portion T. In other words, conveyor 23 moves carriage 19, which determines the position of deflecting member 21 along portion T in direction D1.

Figure 2:
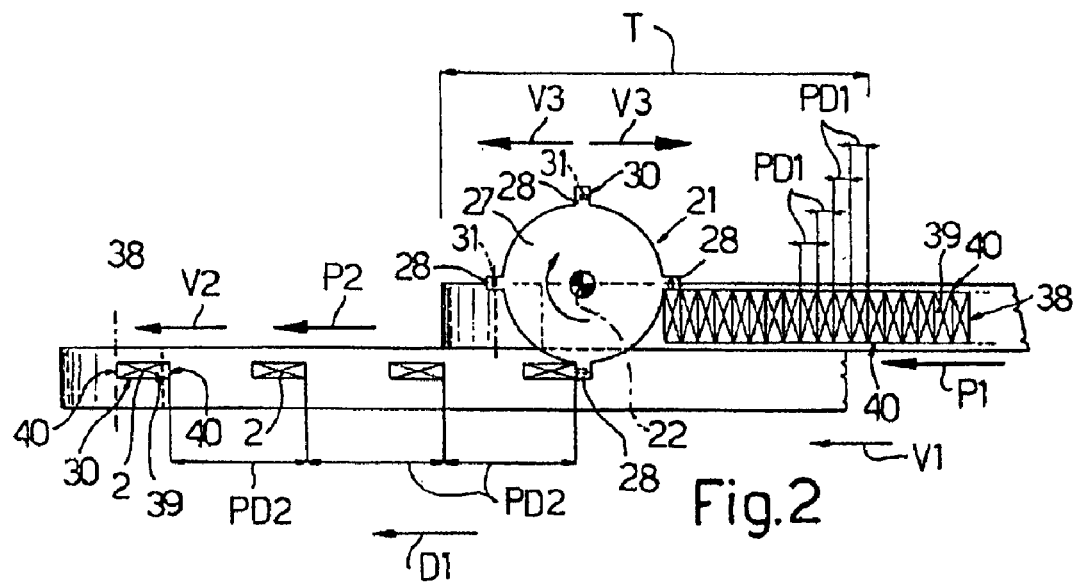
FIG. 2 shows a schematic plan view of a detail of the FIG. 1 assembly.

With reference to FIG. 2, deflecting member 21 comprises a drum 27, from which project radial blades 28; and a motor 29 fitted to carriage 19 and forming part of drive device 17.

Each blade 28 has a face 30, along which are formed suction holes 31 controlled in known manner.

With reference to FIG. 1, in addition to motors 15, 16 and 29, drive device 17 also comprises a differential 32 comprising an epicyclic gear train in turn comprising a sun gear 33 driven by motor 15, a planet carrier 34 driven by motor 16, and a ring gear 35 meshing with planet gears 36 and transmitting motion to one of pulleys 25. In other words, the movement of carriage 19 is a function of speeds V1 and V2 of conveyors 4 and 5. Drive device 17 also comprises a control unit 37 for activating motor 29 as a function of speeds V1 and V2. For which purpose, control unit 37 is connected to and detects the speed of motors 15 and 16, and is connected to and imposes the speed of motor 29.

In actual use, conveyor 4 is connected to machine M1, which operates at rate F1; conveyor 5 is connected to machine M2, which operates at rate F2; and assembly 1 conveys packets 2 between machines M1 and M2 by means of conveyors 4 and 5 and transfer device 6.

In steady operating conditions, rate F1 equals rate F2, and speed V1 differs from speed V2 when the spacing PD1 of packets 2 along conveyor 4 differs from the spacing PD2 of packets 2 along conveyor 5. Each packet 2 has two main faces 38, two lateral faces 39, and two end faces 40, rests on a lateral face 39 both on work branch 10 of conveyor 4 and work branch 14 of conveyor 5, is positioned with main faces 38 perpendicular to direction D1 and contacting the main faces 38 of the adjacent packets 2 on conveyor 4, and is positioned with main faces 38 parallel to direction D1 along conveyor 5. In steady operating conditions, carriage 19 of transfer device 6 is stationary along portion T, and drum 27 rotates at a constant speed depending on rate F1 or F2 and the number of blades 28. Each blade 28 comes into contact with an end face 40 of a packet 2, and rotates packet 2 along a 90° arc to transfer packet 2 from work branch 10 to work branch 14. During transfer, each packet 2 is maintained contacting face 30 of one of blades 28 by suction holes 31; and, once packet 2 is rotated 90°, suction is cut off, and packet 2 is conveyed by conveyor 5 at speed V2.

When rate F1 of the upstream machine varies, or is even zeroed for reasons connected with the operation of machine M1, since spacing PD1 is fixed and related to the dimensions of packets 2, the reduction in rate F1 causes a reduction in speed V1. Rate, speed and spacing are normally related as follows:

rate=speed/spacing

A significant reduction in or zero rate F1 therefore corresponds to a significant reduction in or zero speed V1. The packets 2 accumulated along conveyor 4 prevent deceleration of machine M1 from immediately affecting operation of machine M2. That is, assuming a zero rate F1, zero speed V1, and constant rotation speed of drum 27, carriage 19 is moved rightwards in FIG. 2 at a speed V3 depending on speeds V2 and V1. A rightward movement of carriage 19 increases spacing PD2, so that, given the above equation and the fact that V2 remains constant, rate F2 is less than the steady-state value.

Conversely, when rate F1 is steady and rate F2 varies, e.g. falls, speed V2 falls and carriage 19 is moved leftwards in FIG. 2 to transfer fewer packets 2 than in the steady-state condition. If the rotation speed of drum 27 is maintained constant, spacing PD2 increases; conversely, if the rotation speed of drum 27 falls, spacing PD2 and speed V2 can be adapted to obtain rate F2. If the second conveyor 5 is stationary, then drum 27 must also be stopped, and carriage 19 is moved leftwards to accumulate packets 2 along portion T.

In other words, assembly 1 provides for accumulating packets 2, transferring packets 2 from conveyor 4 to conveyor 5, and at the same time varying the orientation of packets 2.

Figure 3:
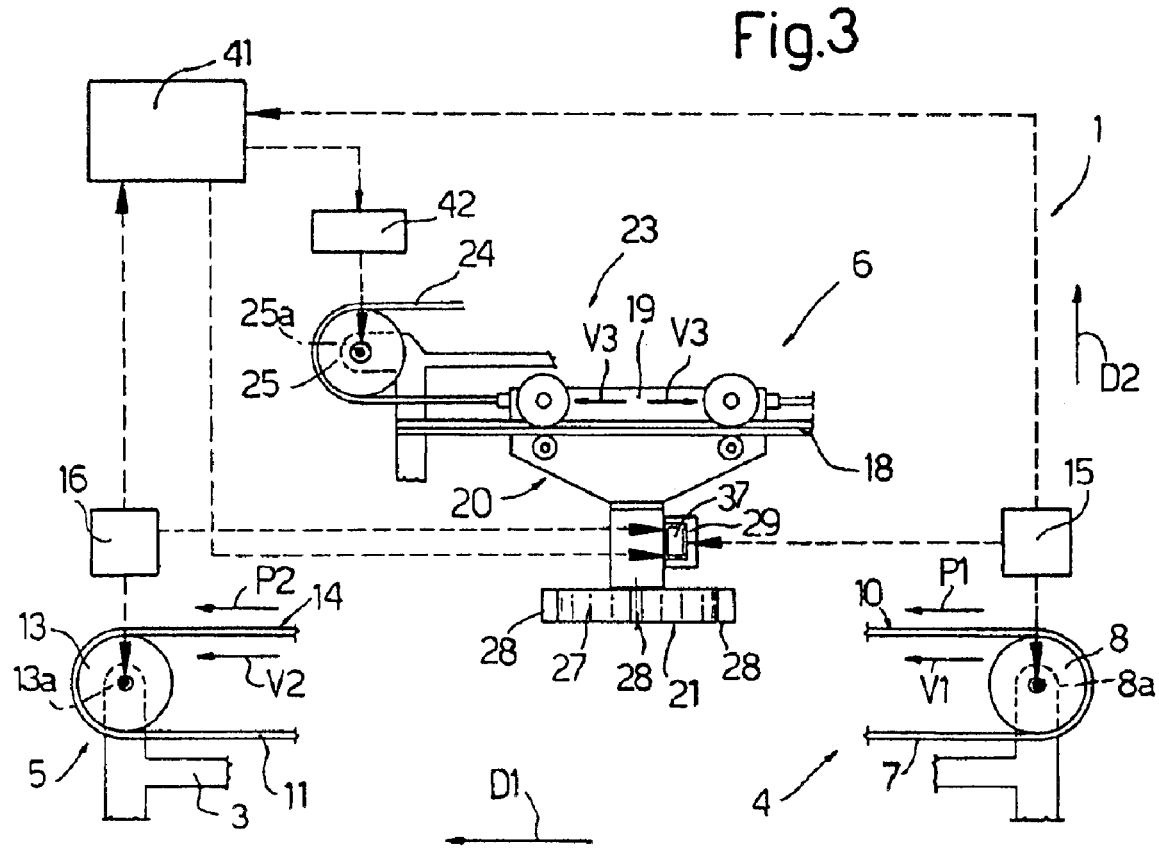
FIG. 3 shows a plan view, with parts removed for clarity, of a variation of the FIG. 1 assembly.

In the FIG. 3 variation, mechanical differential 32 is replaced by an electronic differential 41 connected to a drive member 42, to drive one of pulleys 25 and, therefore, carriage 19, and to control unit 37.

That is, differential 41 transmits a drive signal to drive member 42 to move carriage 19 at speed V3 as a function of speeds V1 and V2, in substantially the same way as epicyclic gear train 32. In addition, electronic differential 41 transmits the drive signal, related to speed V3, to control unit 37 to determine the rotation speed of drum 27 as a function of speed V1, speed V2, and speed V3.

The same obviously also applies to epicyclic gear train 32, in that speeds V1 and V2, or at least the signals related to speeds V1 and V2, are transmitted to control unit 37, and V3 is a function of V1 and V2 according to a given algorithm.

The rotation speed of drum 27 can therefore be adjusted relatively easily when V1 or V2 varies with respect to the steady-state condition, e.g. to maintain a constant spacing PD2 with a zero speed V1. In this case, if a constant rate F2 is imposed, the rotation speed of drum 27 must obviously be increased to increase the transfer rate and compensate the rightward movement of carriage 19, which would alter spacing PD2.

What is claimed is:

1. An assembly for conveying packets (2) comprising a first and a second conveyor (4, 5) for conveying the packets (2) at a first and a second travelling speed (V1, V2) respectively and extending side by side along at least a given portion (T) in a first direction (D1); and a transfer device (6) having a deflecting member (21) for transferring the packets (2) from the first (4) to the second (5) conveyor along said given portion (T); the deflecting member (21) comprising a drum (27) rotating about an axis (22) parallel to a second direction (D2) perpendicular to the first direction (D1) and having blades (28) for varying the orientation of said packets (2) during transfer from the first (4) to the second (5) conveyor; said blades (28) extending radially with respect to said axis (22) to rotate each packet (2) about the axis (22).

2. An assembly as claimed in claim 1, wherein each blade (28) has a face (30) having suction holes for retaining one of said packets (2) during transfer between the first (4) and second (5) conveyor.

3. An assembly as claimed in claim 1, wherein the first and second conveyor (4, 5) respectively comprise a first and a second supporting surface (10, 14) for said packets (2); the first and second supporting surface (10, 14) being substantially coplanar along said given portion (T).

4. An assembly as claimed in claim 3, wherein the first and second conveyor (4, 5) comprise a first and a second belt (7, 11) for conveying the packets (2); the first and second belt (7, 11) respectively comprising a first and a second work branch (10, 11) defining the first and second supporting surface (10, 14) for said packets (2).

5. An assembly as claimed in claim 1, wherein said deflecting member (21) is movable in the first direction (D1) along said given portion (T).

6. An assembly as claimed in claim 5, wherein said transfer device (6) comprises a guide (18) parallel to said first direction (D1); and a carriage (19) which runs along said guide (18); said deflecting member (21) being fitted to said carriage (19).

7. An assembly as claimed in claim 6, wherein said transfer device (6) comprises a transmission member (23) for moving said carriage (19) along said guide (18).

8. An assembly as claimed in claim 7, wherein the first conveyor (4) comprises a first drive member (15) for conveying said packets (2) on the first conveyor at the first speed (V1); and the second conveyor (5) comprises a second drive member (16) for conveying said packets (2) on the second conveyor (5) at the second speed (V2); the assembly (1) comprising a differential (32; 41) connected to the first drive member (15) and to the second drive member (16) to move said deflecting member (21) along said given portion (T) at a given transfer speed (V3) as a function of the first and second speed (V1, V2).

9. An assembly as claimed in claim 8, wherein said differential is an epicyclic gear train (32) comprising a sun gear (33) connected to the first drive member (15); a planet carrier (34) connected to the second drive member (16); and a ring gear (35) connected to said transmission member (23).

10. An assembly as claimed in claim 9, wherein said deflecting member (21) comprises a third drive member (29)

for rotating said deflecting member (21); and a control unit (37) for controlling said third drive member (29); said control unit (37) being connected to the first and second drive member (15, 16) to drive said third drive member (29) as a function of signals related to the first and second speed (V1, V2).

11. An assembly as claimed in claim 8, wherein said differential is an electronic differential (41), which emits a drive signal for driving a fourth drive member (42) for driving said transmission member (23).

12. An assembly as claimed in claim 11, wherein said deflecting member (21) comprises a third drive member (29) for rotating said deflecting member (21); and a control unit (37) for controlling said third drive member (29); said control unit (37) being connected to the first and second drive member (15, 16) and to said electronic differential (41) to drive said third drive member (29) as a function of signals related to the first, second, and third speed (V1, V2, V3).

13. An assembly for conveying packets (2) comprising a first and a second conveyor (4, 5) for conveying the packets (2) at a first and a second travelling speed (V1, V2) respectively and extending side by side along at least a given portion (T) in a first direction (D1); and a transfer device (6) having a deflecting member (21) for transferring the packets (2) from the first (4) to the second (5) conveyor along said given portion (T); wherein the deflecting member (21) is movable back and forth in the first direction (D1) along a linear path parallel to said given portion (T).

14. An assembly as claimed in claim 13, wherein said transfer device (6) comprises a guide (18) parallel to said first direction (D1); and a carriage (19) which runs along said guide (18); said deflecting member (21) being fitted to said carriage (19).

15. An assembly as claimed in claim 14, wherein said transfer device (6) comprises comprises a transmission member (23) for moving said carriage (19) along said guide (18).

16. An assembly as claimed in claim 15, wherein the first conveyor (4) comprises a first drive member (15) for conveying said packets (2) on the first conveyor at the first speed (V1); and the second conveyor (5) comprises a second drive member (16) for conveying said packets (2) on the second conveyor (5) at the second speed (V2); the assembly (1) comprising a differential (32; 41) connected to the first drive member (15) and to the second drive member (16) to move said deflecting member (21) along said given portion (T) at a given transfer speed (V3) as a function of the first and second speed (V1, V2).

17. An assembly as claimed in claim 16, wherein said differential is an epicyclic gear train (32) comprising a sun gear (33) connected to the first drive member (15); a planet carrier (34) connected to the second drive member (16); and a ring gear (35) connected to said transmission member (23).

18. An assembly as claimed in 17, wherein said deflecting member (21) comprises a third drive member (29) for rotating said deflecting member (21); and a control unit (37) for controlling said third drive member (29); said control unit (37) being connected to the first and second drive member (15, 16) to drive said third drive member (29) as a function of signals related to the first and second speed (V1, V2).

19. An assembly as claimed in claim 16, wherein said differential is an electronic differential (41), which emits a drive signal for driving a fourth drive member (42) for driving said transmission member (23).

20. An assembly as claimed in claim 19, wherein said deflecting member (21) comprises a third drive member (29) for rotating said deflecting member (21); and a control unit (37) for controlling said third drive member (29); said control unit (37) being connected to the first and second drive member (15, 16) and to said electronic differential (41) to drive said third drive member (29) as a function of signals related to the first, second, and third speed (V1, V2, V3).

21. An assembly for conveying packets (2) comprising a first and a second conveyor (4, 5) for conveying the packets (2) at a first and a second travelling speed (V1, V2) respectively and extending side by side along at least a given portion (T) in a first direction (D1); and a transfer device (6) having a deflecting member (21) for transferring the packets (2) from the first (4) to the second (5) conveyor along said given portion (T); wherein the deflecting member (21) is movable back and forth in the first direction (D1) along a linear path parallel to said given portion (T); and wherein said transfer device (6) comprises a guide (18) parallel to said first direction (D1), and a carriage (19) which runs along said guide (18); said deflecting member (21) being fitted to said carriage (19).

22. An assembly for conveying packets (2) comprising a first and a second conveyor (4, 5) for conveying the packets (2) at a first and a second travelling speed (V1, V2) respectively and extending side by side along at least a given portion (T) in a first direction (D1); and a transfer device (6) having a deflecting member (21) for transferring the packets (2) from the first (4) to the second (5) conveyor along said given portion (T); the deflecting member (21) comprising a drum (27) rotating about an axis (22) parallel to a second direction (D2) perpendicular to the first direction (D1); wherein the deflecting member (21) is movable back and forth in the first direction (D1) along a linear path parallel to said given portion (T).

* * * * *

UNITED STATES PATENT AND TRADEMARK OFFICE
CERTIFICATE OF CORRECTION

PATENT NO. : 6,845,861 B2
DATED : January 25, 2005
INVENTOR(S) : Mario Spatafora It is certified that error appears in the above-identified patent and that said Letters Patent is hereby corrected as shown below:

Title page,
Item [73], Assignee, "G.D. Societa' Per" should be -- G.D Societa' per --
Item [30], Foreign Application Priority Data, omitted, insert the following: -- Aug. 8, 2002 (IT) BO2002A000527 --

Column 5,
Line 35, delete second occurrence of "comprises"

Signed and Sealed this

Second Day of August, 2005

JON W. DUDAS
*Director of the United States Patent and Trademark Office*